APPARATUS FOR LOCATING INFORMATION IN A MAGNETIC TAPE

Filed Oct. 17, 1952 3 Sheets-Sheet 1

INVENTOR.
JOSEPH T. McNANEY
BY
Walter J. Jason
ATTORNEY

APPARATUS FOR LOCATING INFORMATION IN A MAGNETIC TAPE

Filed Oct. 17, 1952 3 Sheets-Sheet 2

INVENTOR.
JOSEPH T. McNANEY
BY Walter J. Jason
ATTORNEY

APPARATUS FOR LOCATING INFORMATION IN A MAGNETIC TAPE

Filed Oct. 17, 1952 3 Sheets-Sheet 3

INVENTOR.
JOSEPH T. McNANEY
BY Walter J. Jason
ATTORNEY

United States Patent Office 2,721,990

Patented Oct. 25, 1955

2,721,990

APPARATUS FOR LOCATING INFORMATION IN A MAGNETIC TAPE

Joseph T. McNaney, San Diego, Calif., assignor, by mesne assignments, to General Dynamics Corporation, a corporation of Delaware Application October 17, 1952, Serial No. 315,333

14 Claims. (Cl. 340—174)

This invention relates to apparatus for handling data in the form of message codes, and it is primarily suitable for transferring information to and from a storage medium such as a magnetic tape.

Cumbersome filing systems are ordinarily required in order to store information involving a large number of items, such as the names and addresses of a large number of people. Automatic card filing systems have been developed; however, processing the cards is time consuming and a large amount of space is required for storing the cards when they are not being used.

I have developed data handling apparatus which operates rapidly and which requires a relatively small space for storing the records.

In accordance with my invention, information is stored in the form of message codes on a tape, say magnetic tape, and a rotatable magnetic drum is employed to transfer information to or from the tape. The magnetic drum and the tape are moved in synchronism, preferably so that they have equal surface speeds. Two tracks are employed on the magnetic drum for the transfer operation. An identification message code is placed on the first track, and the identification code is compared with the message codes on the tape. When the same identification codes occur simultaneously, a control circuit is actuated to cause subsequent information on the tape to be transferred to the second track of the drum, or to cause information on the second track to be transferred to the tape.

The identification codes are recorded at predetermined locations around the magnetic drum and on the tape, so that identical identification codes will be sensed simultaneously at some time during the synchronous movement of the tape and the drum.

The information on either or both of the tracks of the drum is applied to a read-out which provides a visible record of the information.

Preferably, several channels of tracks are provided on the magnetic drum and several magnetic tapes are employed simultaneously so that the operator can process several items of information during the same interval of time.

The invention is explained with reference to the drawings, in which.

Figure 1:
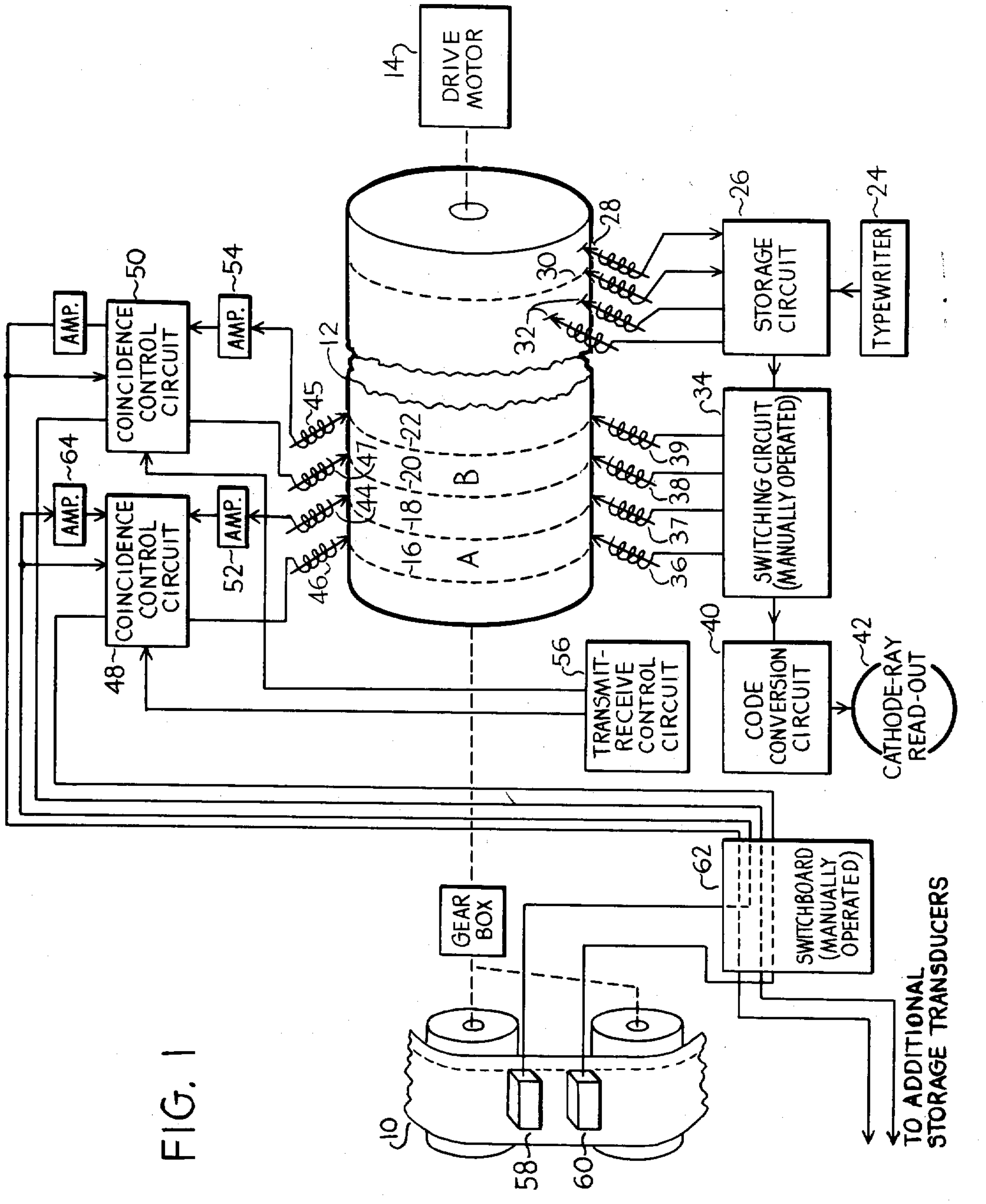
Fig. 1 shows the apparatus in diagrammatic form.

Referring to Fig. 1, a magnetic tape 10 serves as a storage medium for information which is recorded on the tape in the form of message codes. A rotatable drum 12 is employed to transfer information to or from the tape. The drum and the tape are moved in synchronism by a motor 14.

Preferably several recording channels are provided on the drum, and each channel has two tracks. In order to simplify the disclosure, only two channels, A and B, are shown. The tracks 16, 18 are in channel A, and the tracks 20, 22 are in channel B.

Figure 3:
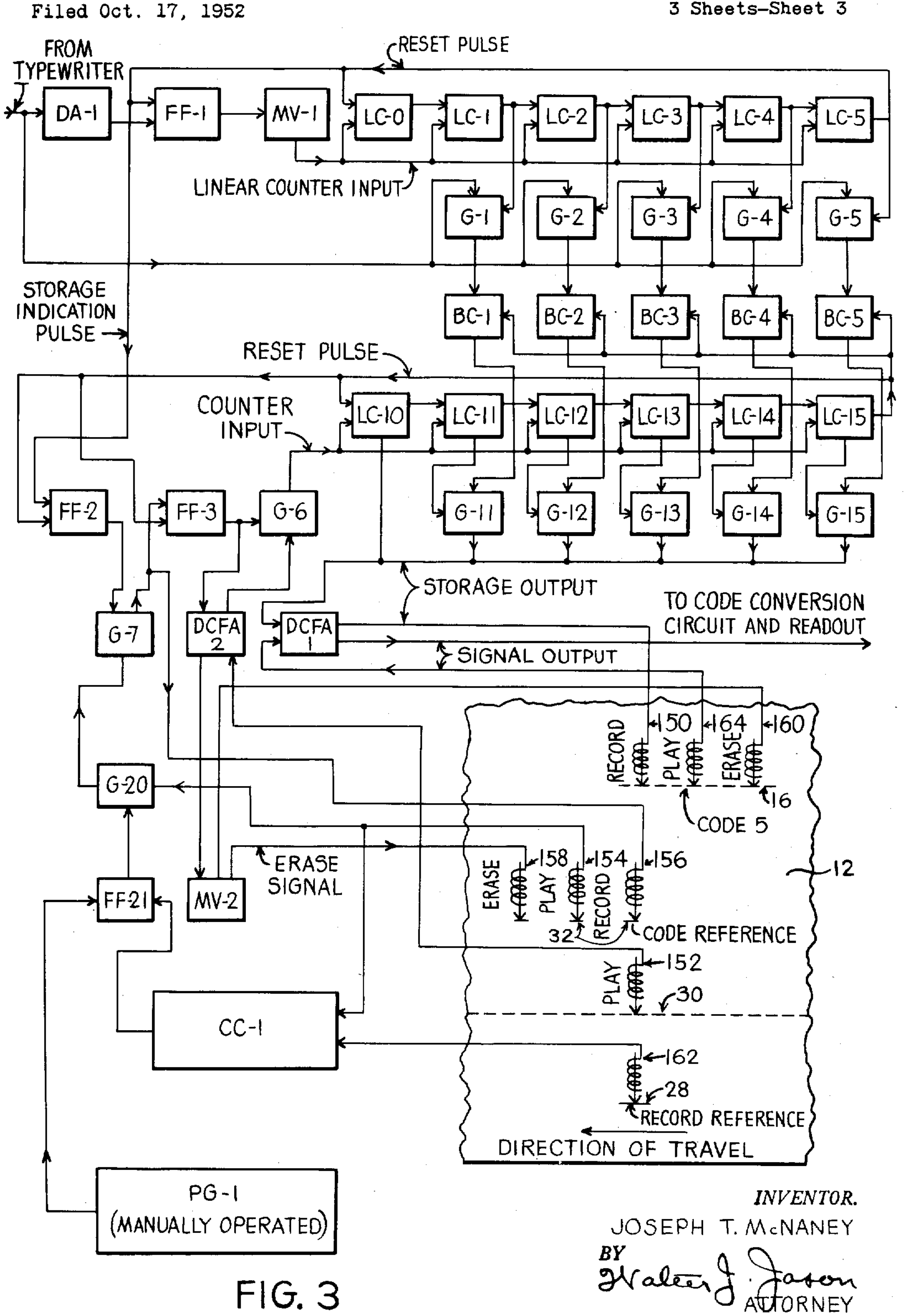
Fig. 3 shows details of the apparatus for recording message codes on the magnetic drum.

A typewriter 24, say a teletypewriter, is employed to record identification codes and other information on the drum. The output of the typewriter is applied to a storage circuit 26 which stores and emits one code character at a time. A suitable storage circuit is shown in Fig. 3.

The storage circuit responds to a record reference pulse 28 which determines the starting and stopping points for recording each series of message codes along the tracks on the drum. A series of timing reference pulses 30 serves to control the sequence of operations in the storage circuit. Code reference pulses 32 serve to mark the locations around the drum at which the successive code characters are recorded. The code reference pulses 32 are caused to "walk" around the drum so that the successive code characters are recorded in sequence. Thus, the message codes recorded in each track begin at a predetermined fixed location, and the successive code characters are recorded in a sequence around the drum without leaving undesired spaces irrespective of the speed of operation of the typewriter 24.

The output of the storage circuit 26 is applied to a switching circuit 34 which serves to connect any one of the transducers 36 to 39 to the storage circuit 26 or to a code conversion circuit 40. The code conversion circuit serves to convert the message codes which are sensed by the transducers 36 to 39 into suitable potentials for actuating a read-out 42. Preferably the read-out 42 is a cathode-ray tube arranged to display images of the characters represented by the code signals. Suitable cathode-ray tube read-outs are disclosed in my Patents Nos. 2,275,017 and 2,283,383 and in my copending application Serial No. 298,603. A suitable code conversion circuit for use with tubes of this general type is disclosed in my copending application Serial No. 340,245.

A pair of transducers 44 and 45 are provided for sensing the message codes recorded along tracks 18 and 22. A pair of transducers 46 and 47 are provided for sensing or recording message codes along tracks 16 and 20.

The transducers 44 and 45 are coupled to coincidence control circuits 48 and 50 through amplifiers 52 and 54. The transducers 46 and 47 are coupled directly to the coincidence control circuits 48 and 50.

Figure 2:
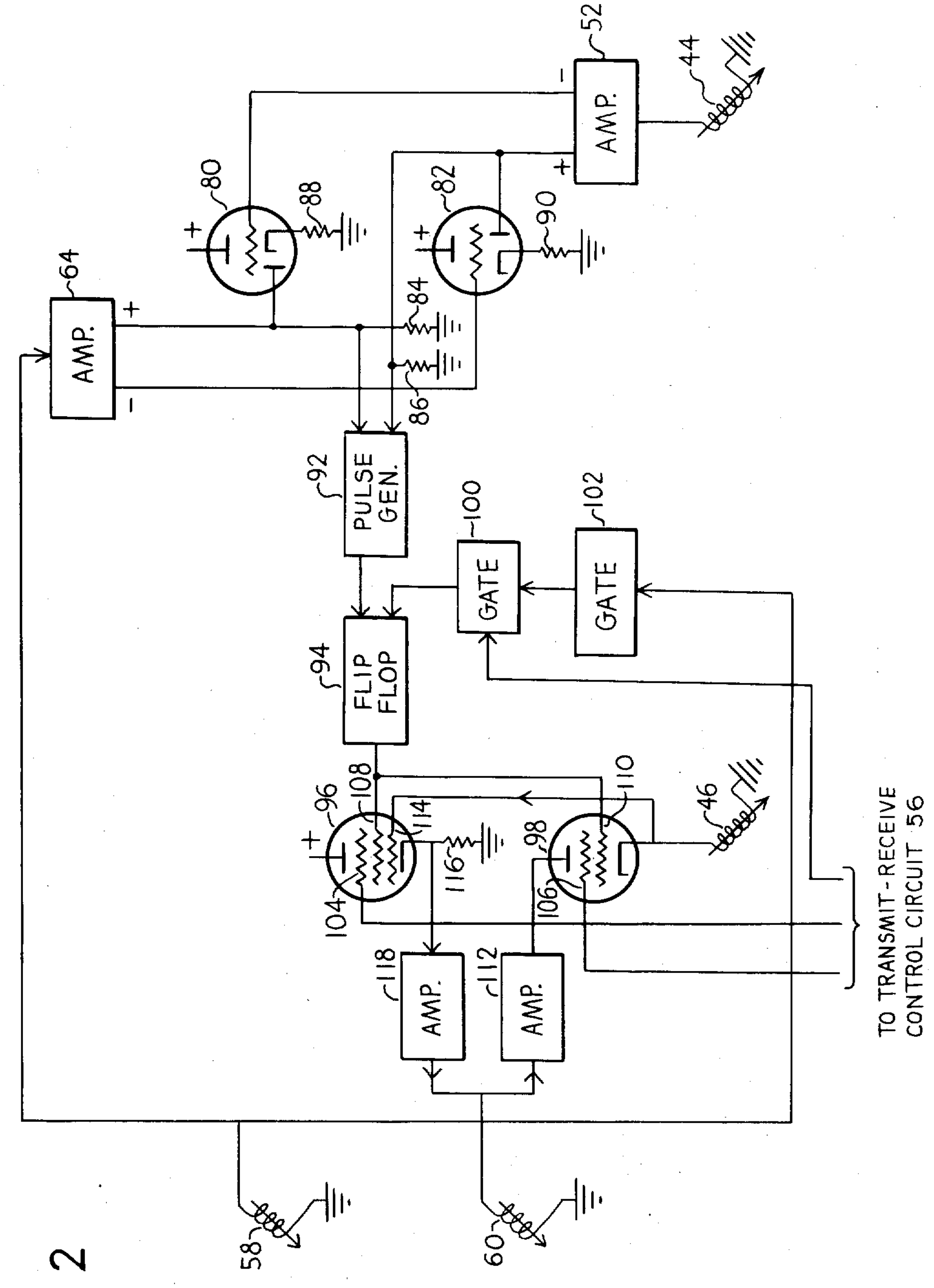
Fig. 2 shows details of the coincidence control circuit of Fig. 1.

The coincidence control circuits 48 and 50 are controlled by a transmit-receive control circuit 56 which serves to cause the respective coincidence control circuits 48, 50 to actuate the transducers 46 and 47 to transmit or receive message codes from the tape in accordance with the setting of the control circuit 56. A suitable coincidence control circuit is shown in Fig. 2.

Two sets of transducers 58 and 60 are provided for sensing and recording information on the tape 10. Each set of the transducers 58, 60 has a plurality of transducers and the desired transducer of each set is connected through a switchboard 62 to the desired coincidence control circuit. The selected transducer in the set 58 is connected to an amplifier 64 which in turn is coupled to the coincidence control circuit 48. The selected transducer in the set 60 is connected through the switchboard 62 to the coincidence control circuit 48. The selected transducers in the sets 58 and 60 may be on the same or on different tracks on the tape 10.

The coincidence control circuit 48 is arranged to compare the message codes sensed by the transducers 44 and 58, and it serves to deactivate the transducer 46 until the same identifying message code is sensed simultaneously by the transducers 44 and 58. When the same identifying message code is compared in the coincidence circuit, it serves to couple the transducer 46 to the transducer 60. Then the transducer 46 may be employed either to read or record information on the track 16, depending upon the setting of the transmit-receive control circuit 56.

As an example of the operation of the apparatus shown in Fig. 1, assume that the tape 10 carries message codes representing the name and address of a person and that it is desired to provide a visible display of this information. An identifying code, say the person's name, is typed on the typewriter 24 and applied to the transducer 37. The tape 10 is caused to move from a predetermined starting point in synchronism with the movement of the drum 12. The transmit-receive control circuit 56 is adjusted to cause the transducer 46 to record information sensed by the transducer 60. As soon as the identifying message codes are simultaneously applied to the coincidence control circuit 48, the transducer 46 is coupled to the transducer 60 and the desired information is then transferred from the tape to track 16 on the drum.

The name of the person is displayed on the read-out 42 by connecting the transducer 37 through the switching circuit to the code conversion circuit 40. Then the transducer 36 is connected to the code conversion circuit 40 to cause the address to be displayed on the read-out 42.

If it is desired to add information to that already recorded on the tape 10, the procedure is as follows: The identifying code signals are recorded on track 18, and the information to be transferred to the tape 10 is recorded on track 16 by means of the typewriter 24 and the switching circuit 34. The transmit-receive control circuit 56 is adjusted to cause the transducer 46 to sense or read the information on the drum. As soon as coincidence is established in the circuit 48, the transducer 46 is connected to a transducer in the set 60 to cause the information on track 16 to be transferred to the tape 10.

Preferably, several channels are provided on the drum 12 and several storage transducers are provided so that the operator then processes more than one item of information at a time. If ten channels are provided on the drum 12 along with ten storage transducers, data can be processed at the rate of one item per minute if it takes an average of ten minutes in order to establish coincidence between the representative identifying message codes.

The apparatus shown in Fig. 2 illustrates one suitable coincidence control circuit for use in the apparatus of Fig. 1.

The outputs of the amplifiers 52 and 64 are applied to two triode tubes 80 and 82 which contain diode elements. The amplifiers 52, 64 are each provided with two output leads, and the amplifiers prvoide signals of the polarity indicated on the drawings, when code signal elements are applied to the inputs of the amplifiers.

The diode elements of the tubes 80, 82 are connected to resistors 84 and 86 respectively. When code signal elements are applied to the amplifiers 52, 64 simultaneously, no signals are developed across the resistors 84 and 86. If a code signal element is received by the amplifier 64 and no signal is received by the amplifier 52 a voltage is developed across the cathode resistor 88 and this voltage causes the output of the amplifier 64 to be applied across the resistor 84 so that a pulse signal is produced across this resistor. If a code signal element is received by the amplifier 52 and no signal is received by the amplifier 64, a voltage is developed across the cathode resistor 90 and the output of the amplifier 52 is applied across the resistor 86 to provide a pulse signal across this resistor.

The signals developed across the resistors 84 and 86 are applied to a pulse generator 92 which serves to produce a pulse at its output when a signal is developed across either of the resistors 84, 86.

The output of the pulse generator 92 is applied to a flip-flop circuit 94 which serves to control the operation of a pair of tubes 96 and 98.

The flip-flop circuit 94 is arranged to change its condition only once in response to pulses received from the generator 92 unless the flip-flop 94 is reset.

A pair of gates 100 and 102 are provided for resetting the flip-flop 94 after each identified code on the tape is sensed by the transducer 58. The gate 100 is controlled by the transmit-receive control circuit 56, and the gate 102 is controlled by the output of the transducer 58. The gate 102 may be arranged to provide a resetting pulse for the flip-flop 94 when a reset signal is sensed by the transducer 58. In the alternative, the gate 102 may be a delay gate arranged to couple the transducer 58 to the gate 100 only when the transducer fails to sense message codes for a predetermined period of time. In this case the gate 102 would reset the flip-flop 94 when the first code signal element of an identification code is sensed by the transducer 58.

The tube 96 has three control grids and the tube 98 has two control grids. The grid 104 of the tube 96 and the grid 106 of the tube 98 are supplied with potentials from the transmit-receive control circuit 56 so that only one of the tubes is blocked. The grid 108 of tube 96 and the grid 110 of tube 98 are connected to the output of flip-flop circuit 94. The flip-flop circuit 94 is arranged to apply potentials to the grids 108 and 110 which block the tubes after a pulse from the pulse generator 92 triggers the flip-flop 94. When the flip-flop circuit 94 is reset, it applies potentials to the grids 108 and 110 which serve to unblock the tubes.

The transducer 46 is connected in series with the cathode of the tube 98, and the plate of this tube is connected to the output of an amplifier 112. Thus, when the tube 98 is activated by suitable potentials applied to the grids 106 and 110, the tube serves to convey signals from the transducer 60 to the transducer 46 so that the transducer 46 records.

The control grid 114 of tube 96 is connected to the transducer 46, and the cathode resistor 116 of this tube is connected to an amplifier 118 so that the tube 96 transmits signals from the transducer 46 to the transducer 60 when suitable potentials are applied to the grids 104 and 108 of the tube 96.

When the message codes of the respective identifying codes do not occur in coincidence, the tubes 96 and 98 are blocked due to the action of the pulse generator 92 and the flip-flop and the flip-flop circuit 94. However, when coincidence is established, the tubes 96 and 98 are not blocked by the flip-flop 94 and one of the tubes is activated by a potential from the control circuit 56. Hence, the transducer 46 is coupled to the transducer 60 so that the transducer 46 reads or records, depending upon the signal from the control circuit 56.

Thus, the tubes 96 and 98 comprise a gate for selectively activating the transducer 46 to read or record.

The apparatus shown in Fig. 3 is a preferred arrangement of the storage circuit 26.

A portion of the outer periphery of the drum 12 is shown with one track 16 illustrated. This track may be any one of the tracks on the drum. The fixed record reference pulse is designated 28, the timing reference pulses are designated 30, and the "walking" code reference pulses are designated 32.

Various types of code signals may be employed, but for the purpose of this disclosure it will be assumed that the code signals are pulse signals of the five-digit binary type such as are employed in teletypewriter systems. A synchronizing or "on mark" pulse occurs at the beginning of each of the five signal elements of a code representing a character.

The output from the typewriter 24 is applied to an amplifier DA–1. The output of the amplifier DA–1 is applied to a binary counter FF–1, and the output of the binary counter FF–1 is applied to a multivibrator MV–1. Upon reception of an "on mark" pulse, the binary counter is switched to an "on" condition which causes the multivibrator MV–1 to generate a time base frequency. The output of the multivibrator MV–1 is applied to a linear counter chain comprising the counters LC–0 to LC–5.

Under stand-by conditions, LC–0 is receptive to negative pulses from MV–1, but LC–1 to LC–5 are in a non-receptive state. When MV–1 produces a negative pulse, LC–0 operates and causes LC–1 to respond to the next negative pulse from MV–1. This process continues until a count corresponding to the code elements has been completed, whereupon a reset pulse restores the counter chain and turns FF–1 "off."

Gates G–1 to G–5 are controlled by the counters LC–1 to LC–5, and the gates are arranged to transfer code elements from the teletypewriter to a binary-counter memory BC–1 to BC–5 when there is coincidence at any one of the gates between a code element and a counter pulse.

Each of the binary-counter memory circuits BC–1 to BC–5 is a bi-stable multivibrator, and code elements are stored by causing the multivibrator to assume the state which represents the code element.

Thus the linear counter chain LC–1 to LC–5, the gates G–1 to G–5, and the binary counters BC–1 to BC–5 serve to convert the sequentially received code signals into binary representations which are stored in the counters BC–1 to BC–5. The code elements which are stored in the counters BC–1 to BC–5 are transferred to a track on the drum.

A linear counter chain LC–10 to LC–15 and control gates G–11 to G–15 serve to transfer information stored in the binary counter BC–1 to BC–5 through one side of the dual cathode-follower amplifier DCFA–1 to a transducer 150 at a fixed rate with respect to the speed of the drum.

The counter chain LC–10 to LC–15 is triggered in sequence by the timing reference signals 30 on the drum which are sensed by a transducer 152 and applied to the counter chain through one side of a dual cathode-follower amplifier DCFA–2 and a gate G–6. The gate G–6 is kept in an "off" condition by a bi-stable multivibrator FF–3 after the latter has been returned to an "off" condition by a reset pulse from the counter LC–15, upon completion of a transfer cycle. While the multivibrator FF–3 is "off," a free-running multivibrator MV–2 is likewise de-energized. The reset pulse from the counter LC–15 also returns another bi-stable multivibrator FF–2 to an "off" condition, rendering the gate G–7 closed to the code reference signals 32 which are applied through a gate G–20.

While the gates G–6 and G–7 are closed, the timing reference pulses 30 on the drum will not affect the linear counter chain LC–10 to LC–15. Also, a code reference pulse 32 will not turn the bi-stable multivibrator "on." This set of conditions will indicate that there is no code in the temporary storage BC–1 to BC–5.

After a complete code from the teletypewriter has been placed in the temporary storage BC–1 to BC–5 the counter LC–5 will deliver a reset pulse to its associated circuits, and it will also deliver a storage indication pulse to multivibrator FF–2, turning the latter "on." This causes gate G–7 to open. When the transducer 154 senses a code reference pulse, the bi-stable multivibrator FF–3 is turned "on" by the signal through gates G–20 and G–7, and another code reference pulse is recorded on the track by the transducer 156. The bi-stable multivibrator FF–3 energizes a free-running multivibrator MV–2 through one side of the dual cathode-follower amplifier DCFA–2, and it also turns gate G–6 on. The free-running multivibrator MV–2 provides a high frequency current to the transducers 158 and 160 for erasing the recorded codes. The leading code reference pulse 32 is erased each time that a code representing a character is transferred to the drum. The message codes in the track 16 may be erased as soon as a full track has been recorded if desired. However, it is ordinarily necessary to retain the message codes for a longer period of time, and in such case the multivibrator MV–2 is actuated manually to cause an erase signal to be applied to the transducer 160.

Thus, the code reference pulses 32 are advanced around the drum in a step-like fashion as individual codes are transferred to the track 16. These code reference pulses serve to reference the positions of individual codes around the drum so that they are recorded in sequence irrespective of the speed of operation of the typewriter.

The record reference pulse 28 serves to reference the start and the finish of a complete record on the track. Thus, the record reference pulse 28 remains in a fixed location.

After one full capacity of codes are recorded in track 16, a code reference pulse 32 is sensed by the transducer 154 and applied to a coincidence circuit CC–1, and at the same instant a record reference pulse 28 is sensed by a transducer 162 and applied to the coincidence circuit CC–1. When this occurs, the coincidence circuit CC–1 actuates a bi-stable multivibrator FF–21, which in turn closes gate G–20, thereby blocking subsequent code reference pulses from reaching gate G–7.

The purpose of filling track 16, and then blocking the system is so that each time a complete set of codes are placed on the track, the recording of codes on another track will be from a correct starting point around the drum. This establishes a common starting point for all records which are recorded on the drum.

Before recording the next track of information on the drum, the manually operated pulse generator PG–1 is actuated by the operator in order to reset the bi-stable multivibrator FF–21 and thereby open the gate G–20.

The message codes on the track 16 are sensed by a transducer 164, and the electric signals produced by the transducer 164 are applied through one side of the dual cathode-follower amplifier DCFA–1 to the code conversion circuit of the read-out.

I claim:

1. Apparatus for locating and reproducing information in a storage medium, comprising a tape having message codes recorded thereon, a rotatable magnetic drum, means for moving the tape and the drum in synchronism, means for selectively recording portions of the message codes and entire message codes at predetermined locations along a first track around the drum, means for comparing the portions of the message codes in said first track with the message codes in the tape and transferring message codes from the tape to a second track on the drum when the same series of portions of the message codes is compared, and means for sensing the message codes in said second track and providing a record of the information represented by the message codes.

2. Apparatus for locating and reproducing information in a storage medium, comprising a tape having message codes recorded thereon, a rotatable magnetic drum, means for moving the tape and the drum in synchronism, means for selectively recording portions of the message codes and the entire message codes at predetermined locations along a first track around the drum, means for comparing the portions of the message codes in said first track with the message codes in the tape and transferring message codes from the tape to a second track on the drum when the same series of portions of the message codes is compared, means for sensing the message codes in said second track, a code conversion circuit coupled to said sensing means, and a cathode-ray read-out coupled to the code conversion circuit for providing a visible record of the information represented by the message code signals applied to the code conversion circuit.

3. Apparatus for locating and reproducing information in a storage medium, comprising a tape having message codes recorded thereon, the message codes including a plurality of identifying codes recorded at predetermined locations along the tape, a rotatable magnetic drum, means for moving the tape and the drum in synchronism, means for recording one of the identifying message codes at a predetermined location along a first track around the identifying drum, means for comparing the message codes in said first track with the identifying message codes in the tape and transferring message code information from the tape to a second track around the drum when the same identifying message codes are compared, means for sensing the message codes in said first and second tracks around the drum, a code conversion circuit coupled to said sensing means, and a cathode-ray read-out coupled to the code conversion circuit for providing a visible record of the information represented by the message codes recorded in the first and second tracks on the drum.

4. The apparatus of claim 3 wherein the means for recording one of the identifying message codes at a predetermined location along a first track around the drum comprises a typewriter for providing code signals representative of the code characters to be recorded, a storage circuit coupled to the typewriter for storing the code characters provided by the typewriter, means coupled between the storage circuit and the drum for providing a movable reference pulse on the drum to mark the locations on the drum at which the successive code characters are recorded, and a transducer coupled to the storage circuit for recording the code characters along said first track around the drum.

5. Apparatus for locating and reproducing information in a storage medium, comprising a tape having message codes recorded thereon, a rotatable magnetic drum, means for moving the tape and the drum in synchronism, means for selectively recording portions of the message codes and entire message codes at predetermined locations along a first track around the drum, a transducer for recording message codes along a second track around the drum, means for comparing the portions of the message codes in said first track with the message codes in the tape and causing said transducer to provide a record on the drum of the message codes in the tape when the same series of portions of the message codes is compared, means for sensing the message codes in said first and second tracks, and means coupled to the sensing means for selectively providing a record of the information represented by the message codes which are recorded in the first and second tracks.

6. In combination, a tape having message codes recorded thereon, a rotatable magnetic drum, means for moving the tape and the drum in synchronism, means for selectively recording portions of the message codes and entire message codes at predetermined locations along a first track around the drum, a transducer located along a second track around the drum, and means for comparing the portions of the message codes in said first track with the message codes in the tape and selectively actuating said transducer to sense or to record message codes on the drum when the same series of portions of the message codes is compared.

7. Apparatus for locating information in a tape having a plurality of different identifying message codes recorded thereon, comprising a rotatable magnetic drum, means for moving the tape and the drum in synchronism, the tape being started from a predetermined point with respect to the locations of the identifying message codes, means for recording one of the identifying message codes at a predetermined location along a track around the drum, a pick-up for sensing the message codes on the tape, a pick-up for sensing the message codes on the drum, and a coincidence circuit for comparing the identifying message codes sensed by said pick-ups and providing a predetermined electrical condition when the same identifying message codes are sensed by said pick-ups.

8. In combination, a tape having message codes recorded thereon, the message codes including a plurality of identifying codes recorded at predetermined locations along the tape, a rotatable magnetic drum, means for moving the tape and the drum in synchronism, the tape being started from a predetermined point with respect to the locations of the identifying message codes, means for recording one of the identifying message codes at a predetermined location along a first track around the drum, a transducer located along a second track around the drum, and means for comparing the identifying message codes in said first track with the message codes in the tape and de-activating said transducer when different identifying message codes are compared.

9. Apparatus for transferring information to and from a storage medium, comprising a tape having message codes recorded thereon, the message codes including a plurality of identifying codes recorded at predetermined locations along the tape, a rotatable magnetic drum, means for moving the tape and the drum in synchronism, the tape being started from a predetermined point with respect to the locations of the identifying message codes, means for recording one of the identifying message codes at a predetermined location along a first track around the drum, a transducer located along a second track around the drum, and means for comparing the identifying message codes in said first track with the message codes in the tape and selectively activating said transducer to sense or to record message codes on the drum when the same identifying message codes are compared.

10. The apparatus of claim 9 further including means coupled to a transducer which is located along the second track around the drum for sensing and recording message codes on the tape.

11. The apparatus of claim 9, wherein the means for recording message codes on the drum comprises a typewriter for providing code signals representative of the code characters to be recorded, a storage circuit coupled to the typewriter for storing and emitting code signals representing one character at a time, means coupled between the storage circuit and the drum for providing a movable reference pulse on the drum to mark the location on the drum at which each code character is recorded, and a transducer coupled to the storage circuit for recording the code characters on the drum.

12. In combination, a tape having message codes recorded thereon, a first transducer disposed adjacent the tape, a magnetic drum, means for moving the tape and the drum in synchronism, means for selectively recording portions of the message codes and the entire message codes at predetermined locations along a first track around the drum, a second transducer for sensing the message codes in said first track, a third transducer disposed adjacent the drum for sensing and recording message codes along a second track around the drum, a gate coupled to the third transducer, and a coincidence circuit coupled to the first and second transducers for actuating the gate when the same series of portions of the message codes is sensed by the first and second transducers.

13. The apparatus of claim 12 further including means coupled to said gate for sensing message codes on the tape and applying electric code signals through said gate to the third transducer.

14. The apparatus of claim 12 further including means coupled to said gate for recording message codes on the tape in response to electric code signals produced by the third transducer.

References Cited in the file of this patent

UNITED STATES PATENTS

| | | |
|---|---|---|
| 2,246,449 | Marshall | June 17, 1941 |
| 2,594,731 | Connolly | Apr. 29, 1952 |
| 2,609,439 | Marshall et al. | Sept. 2, 1952 |
| 2,611,813 | Sharpless et al. | Sept. 23, 1952 |
| 2,614,169 | Cohen et al. | Oct. 14, 1952 |
| 2,617,704 | Mallina | Nov. 11, 1952 |
| 2,628,346 | Burkhart | Feb. 10, 1953 |
| 2,628,689 | Rieber | Feb. 17, 1953 |